United States Patent [19]

Kurihara

[11] Patent Number: 4,842,673
[45] Date of Patent: Jun. 27, 1989

[54] APPARATUS FOR TRANSFERRING AND PLACING DECORATIVE ARTICLES

[75] Inventor: Akira Kurihara, Gunma, Japan

[73] Assignee: Jakob Schlaepfer & Co. AG, Switzerland

[21] Appl. No.: 939,869

[22] Filed: Dec. 10, 1986

[30] Foreign Application Priority Data

Dec. 12, 1985 [GB] United Kingdom ............... 8530561

[51] Int. Cl.$^4$ ............................................ B65C 9/18
[52] U.S. Cl. ...................................... 156/541; 83/116; 156/238; 156/239; 156/584; 414/417
[58] Field of Search ............... 414/403, 411, 416, 417, 414/412, 222; 83/113, 116, 267; 221/74; 2/246; 156/234, 238, 239, 541, 542, 584; 29/426.3, 822, 791, 809, 700, DIG. 78; 198/688.1

[56] References Cited

U.S. PATENT DOCUMENTS 4,190,472  2/1980  Slonicki ........................ 156/542 X
4,494,902  1/1985  Kuppens et al. ................ 221/74 X

FOREIGN PATENT DOCUMENTS 2644462  8/1977  Fed. Rep. of Germany.
197710  10/1977  U.S.S.R. ............................ 414/222

Primary Examiner—David A. Bucci
Attorney, Agent, or Firm—Ostrolenk, Faber, Gerb & Soffen

[57] ABSTRACT

Decorative articles (8) are located at spaced intervals over apertures (2) provided in a carrier tape (1). An elongate piston rod (16) is actuable by a piston (14) to move along a linear path. A toothed wheel (3') is rotatable and is formed diametric with channels (13) therein. Teeth (12) of the wheel guide the tape (1) to sequentially align the apertures carrying said articles with a predetermined rotational position wherein the piston rod (16) can move along the linear path through a channel (13) to act thereby on the decorative article to transfer and place it on a substrate (9).

9 Claims, 4 Drawing Sheets

APPARATUS FOR TRANSFERRING AND PLACING DECORATIVE ARTICLES

This invention relates to the embellishment of sheet materials by decorative articles either by the direct transfer and placing of the decorative article onto the material or via an intermediate pattern formed by transferring and placing the decorative articles on a suitable carrier sheet which can be used in said embellishment. The invention relates in particular to an apparatus for effecting the transfer and placing of items onto a substrate.

In the textile industry it is desirable to enrich sheet material by embellishing it with a design of decorative articles such as rhine stones. Naturally, the process of placing the decorative articles on the sheet material in a particular design must be precise in order to obtain a design of high quality decorative appearance, notwithstanding that the decorative articles themselves are small.

Co-pending PCT Patent Application No. EP85/00580 describes an automated process for producing embellished sheet material. A carrier sheet is provided with a surface contact adhesive to temporarily retain inverted decorative articles for subsequent impressing on to a textile material. Typically, the decorative articles have an adhesive layer on their reverse side which is heat sensitive. Once the carrier sheet is pressed onto a textile material pressure and heat is applied which can cause the heat sensitive adhesive to flow into the adjacent surface of the textile material to develop a bond thereto. After release of the heat and pressure, the carrier sheet can be peeled back from the decorative articles leaving them in the required design on the textile material. Of course, the decorative articles can be applied directly to the textile material. However, the use of a carrier sheet allows stocks of particular designs to be held. As described in the aforementioned patent application, prior to producing the embellished material the decorative articles are carried on a elongate tape which constitutes an intermediate support for each decorative article.

FIG. 1 shows an apparatus for transferring and placing decorative articles. It shows an elongate tape 1 with a regular series of apertures 2 formed therein. Even number apertures are left blank whereas odd number apertures have an inverted decorative article adhered thereto either as a result of adhesive on the article or the tape. The tape extends between two reels (not shown) and the stepping movement of the tape past a head 4 is controlled by a sprocket wheel 3 located conveniently between the reels. The teeth of the sprocket wheel 3 engage with the even number apertures of the tape.

The head 4 has a channel 6 receiving a rod or cylinder 5 actuable to move linearly, vertically as shown, towards an opposing anvil 7. The actuation of the rod 5 takes place with the movement of the tape 1 by the sprocket 3 so that as the end of the rod 5 moves towards anvil 7 it passes through an appropriately positioned odd number aperture 2 to act on a decorative article 8. A substrate 9 (in this case the final textile material) passes between the head 4 and the anvil 7 in synchronisation with actuation of the rod 5 so as to receive the article 8 as the rod 5 passes through the respective aperture 2. Consequently, by actuation of the rod 5, decorative articles 8 are transferred from the tape 1 and are placed at appropriate locations on the material 9. As is known from the aforementioned patent application, once the articles 8 are located on the textile material 9, by suitable application of heat and pressure, a substantially permanent bond can be achieved between the transferred article 8 and the material 9.

An array of the apparatus shown in FIG. 1 can be arranged across the width of a textile material and by appropriate actuation of selected individual apparatus, a variety of different designs can be produced as the material passes under the respective heads. In this way complex designs on large size textile materials can be produced. It is apparent that the operation of the apparatus shown in FIG. 1 is readily applied to producing a design on a carrier sheet by inverting the articles 8.

The apparatus described above with reference to FIG. 1 of the accompanying drawings suffers from the disadvantage, however, that movement of the plunger must be synchronous with the movement of the sprocket wheel or wheels controlling the movement of the tape carrying the articles. Furthermore, it is essential that the sprocket wheels move to bring the article directly into register with the axis of movement of the rod or cylinder. In practice slight variations in the tape may well result in the article being slightly off-centre with respect to the axis of the rod or cylinder with a result that uneven pressure may be applied to the article during the formation of the decoration.

The present invention seeks to provide improved apparatus for transferring and placing decorative articles whereby the number of mechanical components is reduced thereby reducing the size and simplifying the apparatus. At the same time, the present invention seeks to provide more positive location of the article with respect to the plunger.

According to the invention there is provided apparatus for transferring and placing decorative articles which are located at spaced intervals over apertures provided in a carrier tape, the apparatus comprising an elongate element actuable to move along a linear path; and rotatable head means formed to allow said element at predetermined rotational positions to pass therethrough on said linear path, the head means also being formed to guide the tape by said rotation to sequentially align respective apertures in the path of said element passing through the head means. Consequently, a compact and simplified transfer and placing apparatus can be achieved which substantially meets the aforementioned objects.

Preferably, the head means is formed with teeth to guide the tape, the teeth locating in apertures provided in said carrier tape. Conveniently, the head means includes at least one channel passing through the axis of rotation of the head means. Thus, the present invention allows the stepping action of the tape and the action of transferring and placing of the decorative article from the carrying tape onto a substrate to be effected simply and in a more compact manner than hitherto known.

In a further embodiment of the invention three channels may be assymmetically disposed in said head means one with respect to the other. In a typical embodiment of the invention the head means may comprise a disc having a depth greater than the channels. The disc may have a portion removed about its axis to expose the channels in that portion. The head means may be connected to gear means adapted to index said rotation sequentially to align the article carrying the aperture in the carrier tape in the path of said element through said head means.

The head means may be carried by a housing which housing is floating with respect to a support bracket for the apparatus. The operation of the elongate element may initially cause downward movement of that housing carrying said head means prior to said elongate element passing through said head means to express a decorative article from a carrier tape passing thereover. The head means may be carried by housing means biased against movement of the push rod whereby the housing means and head means carried thereby is lowered to an operative position before further downward movement of the elongate member expresses an article in the path of said elongate member from said tape.

Following is a description by way of example only and with reference to the accompanying drawings of methods of carrying the invention into effect.

Figure 2:
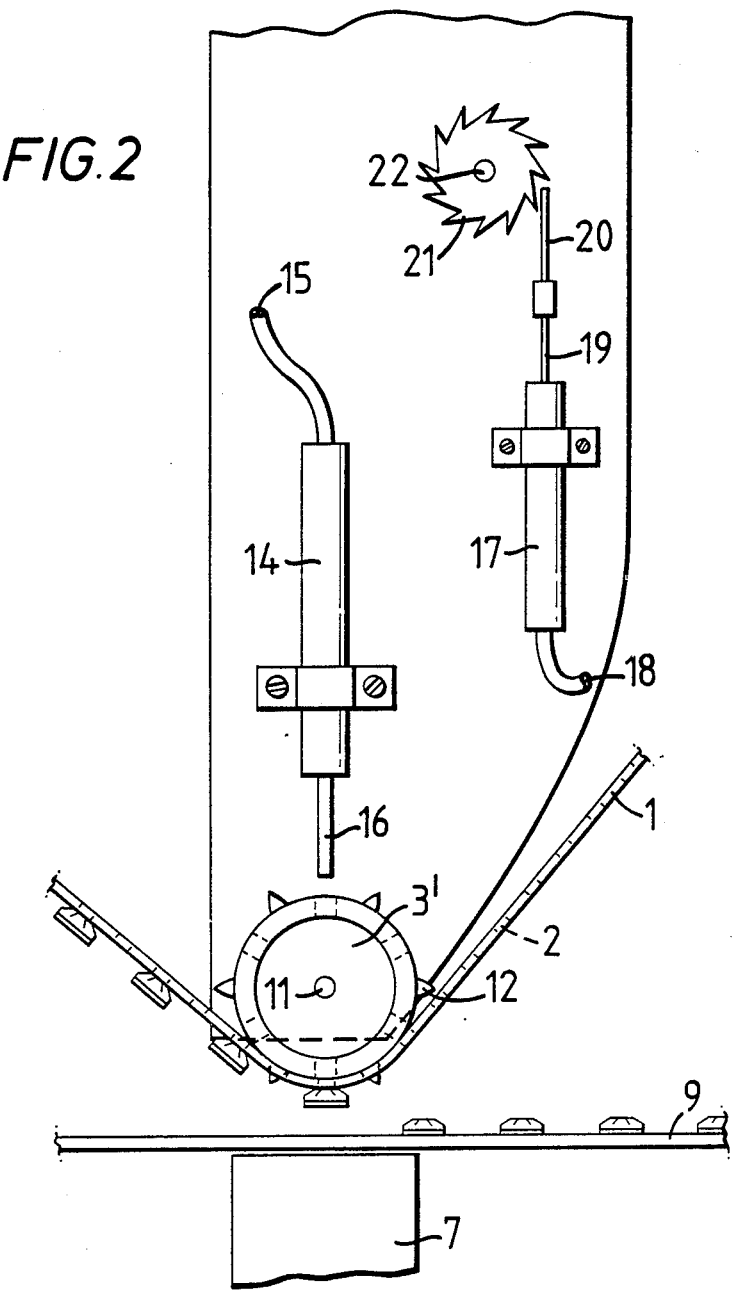
FIG. 2 illustrates a front view of a transferring and placing apparatus embodying the present invention.

Components common to each of the Figures bear common reference numerals. Referring to FIG. 2, a sprocket wheel 3' is rotatable about an axle 11 and has teeth 12 adapted to enter the even number apertures 2 formed in the tape 1. By suitable rotation of the sprocket wheel 3', the tape 1 is guided past the lowest surface of the wheel 3'.

Figure 1:
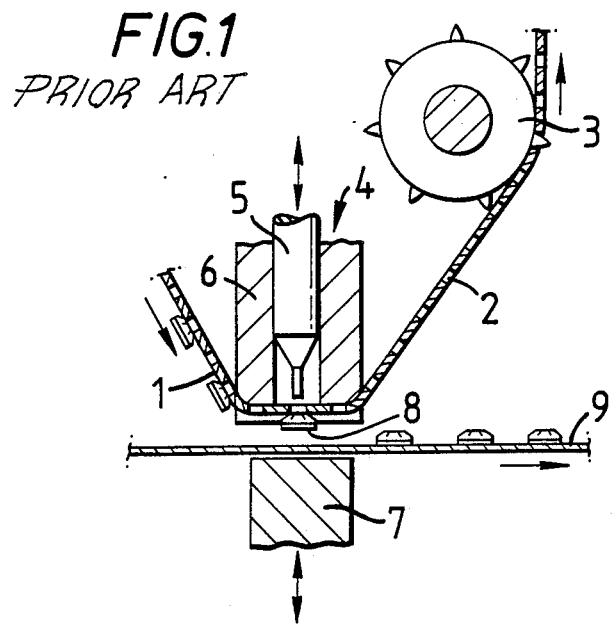
FIG. 1 illustrates a prior article transferring and placing apparatus.
Figure 4:
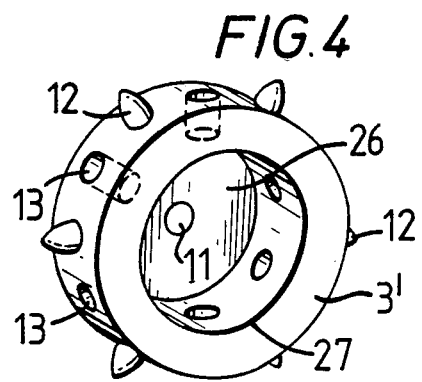
FIG. 4 illustrates an oblique view of the sprocket wheel.

Referring to FIG. 4, the sprocket wheel 3' comprises a solid disc having three symmetrically arranged diametric channels 13, although it will be apparent the number of channels is selected for convenience. A central portion 27 of reduced radius is removed from the wheel to just expose all of the channels 13 so that a solid back force 26 of the wheel is provided. It will be apparent that the central portion is removed preferably in order to reduce the weight of the wheel. Thus, as the sprocket wheel 3 rotates the channels 13 align with the odd number apertures 2 having the decorative articles 8 thereon.

Referring again to FIG. 2, a piston 14 powered by, for example, air pressure through a pipe 15 includes a piston rod 16 located above the sprocket wheel 3' so that the piston rod 16 lies in the plane of the channels 13. Consequently, a channel 13 can be aligned with the rod 16 so that on actuation of the cylinder 14, the piston rod 16 executes a linear path through a diametric channel 13, through an odd number aperture 2 to act on the article 8 to urge it out of contact with the tape 1 and on to the substrate 9.

Therefore, the piston transferring and placing the articles can be placed above the sprocket wheel thereby saving space. Although it is shown that the piston rod 16 passes through the channel 13, an alternative is to have the piston 16 or a lever thereof located within the removed portion 27 of the sprocket wheel 3' so that a suitable pin can pass through one half only of a channel 13 to act on the respective article 8.

It will be apparent that the indexing of the wheel 3' must be arranged to align the channels 13 with the axis of the piston rod 16. A convenient apparatus is for a further piston 17 to be actuated through an air supply pipe 18 so as to drive the piston rod 19 of the piston 17 to move an attached spring lever 20 to rotate a further angled tooth sprocket wheel 21 about an axle 22. Each actuation of the piston 17 rotates the wheel 21 by two teeth.

Figure 3:
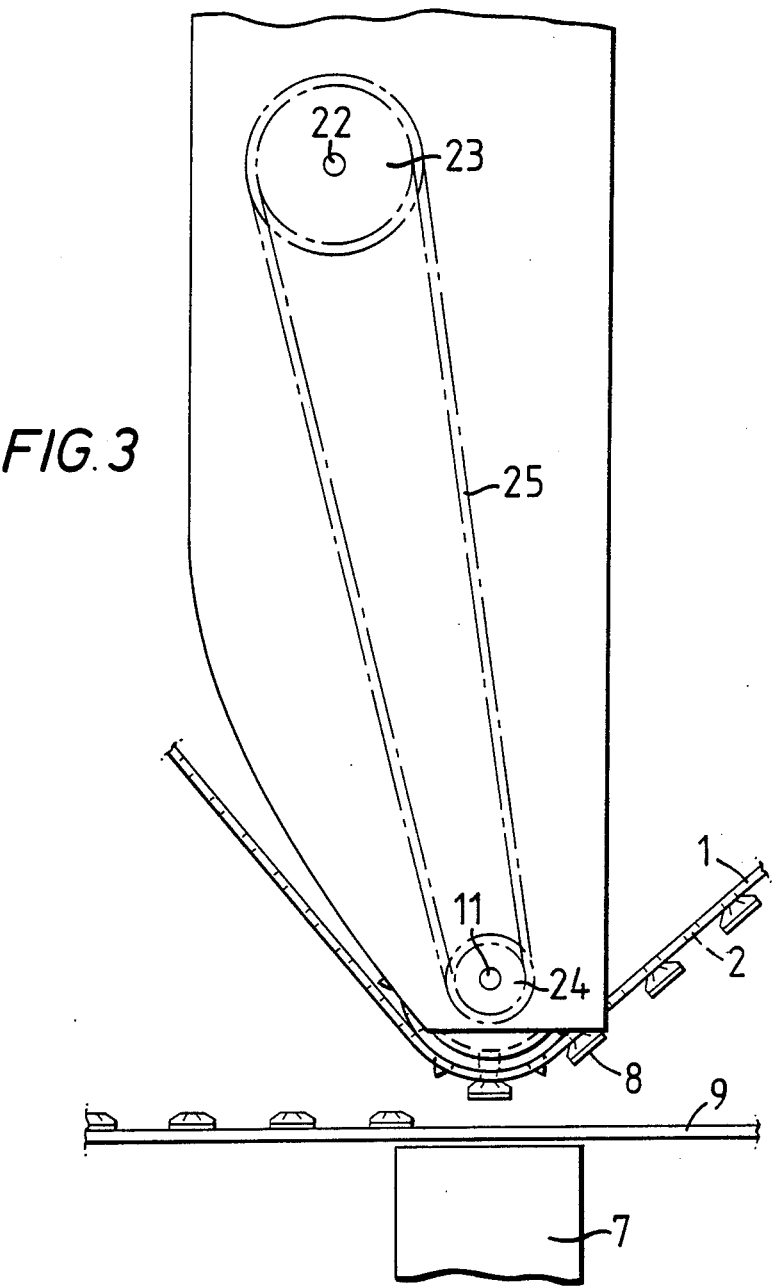
FIG. 3 illustrates a rear view of the transferring and placing apparatus shown in FIG. 2.

Referring to FIG. 3, a further sprocket wheel 23 is rotated by axle 22. The wheel 23 is connected by a toothed band 25 to another sprocket wheel 24 rotating on the axle 11 of the sprocket wheel 3'. The gauge of the teeth of the sprocket wheels 23 and 24 are selected so that a single actuation of the cylinder 17 rotates the sprocket wheel 3' by two aperture distances of the tape to bring another channel 13 and odd aperture into alignment with the axis of rod 16.

Figure 5:
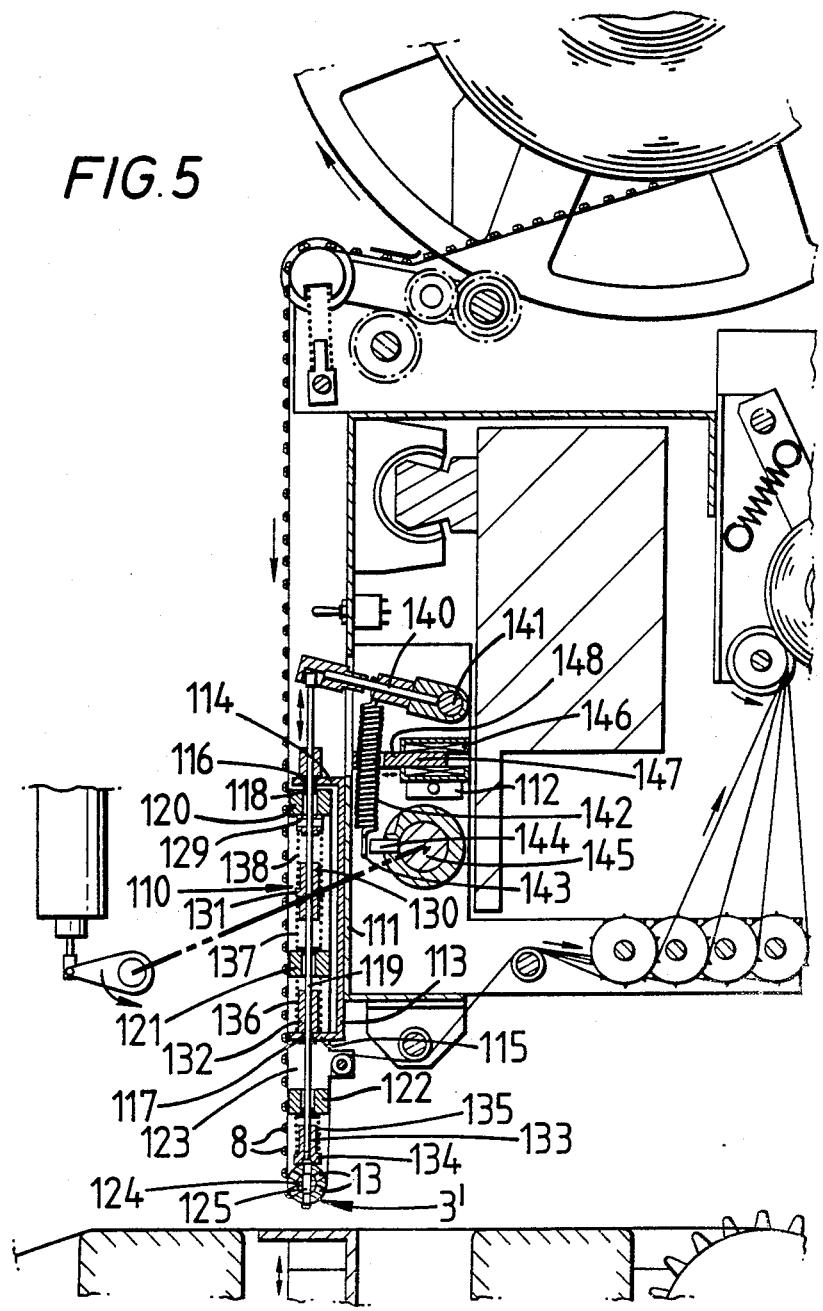
FIG. 5 is a section through an alternative embodiment of a device in accordance with the present invention.

Turning now to the embodiment of FIG. 5, the apparatus for transferring and placing decorative articles in accordance with the present invention is shown as installed on a decorating machine. The device, indicated generally at 110, is mounted on a carriage plate 111 having actuating mechanism 112. The placing device 110 is carried by a support bracket 113 having an upper flange 114 and a lower flange 115. Each of flanges 114 and 115 is provided with through bores 116 and 117 respectively, each of which bores carries a bush 118 accommodating a vertically disposed push rod 119 for axial sliding movement with respect to bracket 113.

Push rod 119 also carries three vertically spaced housing members 120, 121 and 122, each of which has a central bore through which push rod 119 passes. Each of housing members 120, 121 and 122 carries on each side thereof a planar housing piece of which 123 is shown in FIG. 5. The housing pieces 123 are disposed in spaced parallel relationship and extend vertically from the upper extremity of housing member 120 to below lower housing member 122. Each housing piece is secured to each of the housing members by at least two fixings. The lower extremity of each housing member supports a stub axle 124 extending between said members 122; which axle 124 has a diametric through bore 125 therein, through bore 125 being coaxial with the bores in housing members 120, 121 and 122 and adapted accommodate the lower portion of push rod 119 when the latter is in an extended position. It will be noted that in the embodiment as illustrated in FIG. 5, the upper housing member 120 is juxtaposed upper flange 114 whereas the intermediate housing member is spaced upwardly of lower flange 115 and lower housing member is disposed in spaced relationship below flange 115.

Push rod 119 carries an upper bush 130 made of plastics material, said upper bush having a central circumferential flange 131. Push rod 119 also accommodates an intermediate bush 132 and a lower bush 133. Lower bush 133 has towards its lower end a circumferential flange 134 and the lower portion of which is configured to accommodate the spaced tines and arcuate surface of juxtaposed tine wheel 3', of construction generally as described with respect to FIG. 4 above. Lower bush 133 is biased downwardly by means of compression spring 135 acting between lower housing member 122 and the flange thereon 134 of bush 133. Said bush 133 serving to align through bore 13 with through bore 125 in the stub axle thereby permitting passage of push rod 119 through the aligned bores on depression thereof.

A second compression spring 136 is disposed between intermediate housing member 121 and flange 132. A third compression spring 137 is disposed between the flange 131 on upper bush 130 and the upper surface of intermediate housing member 121. A fourth compression spring 138 is disposed between a circumferential flange 131 on upper bush 130 and the underside of upper housing member 120, the arrangement being such that the housing members and planar housing pieces are floating with respect to bracket 113 and are biased to a datum position by means of the interaction of second, third and fourth compression springs 136, 137 and 138 respectively.

The actuating mechanism 112 comprises a rocker arm 140 adapted to rock about shaft 141. A tension spring 142 has an eye 143 at its lower end, said eye being engageable with a peg 144, carried by a shaft 145 adapted to execute arcuate rocking movement about its axis. A solenoid assembly 146 includes an armature 147, the end of which 148 embraces tension spring 142 whereby actuation of the solenoid assembly 146 causes withdrawal of the armature 147 and brings the eye 143 of spring 142 into engagement with peg 144. Rocking of the shaft 145 will produce downward movement of rocker arm 140 and commences depression of push rod 119 in a downward direction. Movement of push rod 119 downwards produces corresponding downward movement of collar 129 with the rod to which it is secured. This results in progressive compression of spring 138 and spring 137. The relative compression strength of springs 138 and 137 and spring 136 are such that the compression of springs 138 and 137 serves to drive intermediate housing member 121 downwardly against the bias of spring 136 to move the whole of housing assembly 123 and the associate housing members downwardly, thereby moving the sprocket wheel 3' carried thereby into juxtaposition with an adhesive paper sheet to which an article is to be applied. Continued downward movement of the push rod 119 brings intermediate housing member into contact with the upper end of an intermediate bush 132 and limits further downward movement of the housing with the sprocket wheel 3' in juxtaposition to the surface of the sheet. Continued downward movement produces further compression of springs 138 and 137 until collar 129 abuts the upper surface of upper bush 130, the lower surface of which is in abutment with the upper surface of intermediate housing member 121. In this position the push rod 119 passes through the bore 125 in the sprocket wheel to contact an article carried on the tape surrounding the end thereof and to press said article firmly into adhesive contact with the paper sheet in juxtaposition thereto.

On the return stroke of the reciprocating shaft 145 the eye 143 is moved upwardly to produce corresponding upward movement of rocker arm 140 and to allow the bias of springs 136, 137 and 138 to urge the housing members 120, 121 and 122 and the associated housing pieces 123 upwardly to its datum position on completion of the stroke. Disengagement of the solenoid will allow the armature to return to its datum position thus disconnecting eye 143 from peg 144 thereby allowing peg 144 to complete actuating strokes without the corresponding operation of push rod 119.

It will be appreciated from this embodiment that not only is the decorative article carried by the tape positively aligned with the stroke of the push rod, but that the tined wheel and the article are lowered towards the adhesive paper sheet, thereby providing improved clearance between adhesive paper sheet and an article in the aligned position when the push rod is not activated and to bring the article into closer juxtaposition with the paper sheet prior to removal thereof from the carrier tape when an article is being located on said adhesive paper sheet.

It will be apparent that the present invention achieves a compact and simplified transfer and placing apparatus compared with the apparatus hitherto known. It will be seen that the apparatus shown in FIGS. 2 and 3 and the wheels of FIG. 4 can be susceptible to considerable modification in order to achieve alignment of an aperture or channel in the wheel 3' with a rod passing therethrough to act on a decorative article. Decorative article is to be construed as encompassing any article suitable for embellishing a textile material.

I claim:

1. Apparatus for transferring and placing decorative articles which are located at spaced intervals along a carrier tape, wherein the carrier tape also has sequentially aligned channels provided along the carrier tape, the apparatus comprising:

an elongate element and means for actuating the elongate element to move along a linear path;

a circular rotatable head means having at least one channel passing diametrically all the way therethrough, the channel being placed and formed on the rotatable head means so that at predetermined rotational positions of the rotatable head means the elongate element is able to pass through the channel that is then on the linear path;

the rotatable head means having teeth for guiding the tape to move from off the rotatable head means, past the rotatable head means by the rotation of the rotatable head means and for sequentially aligning respective ones of the channels of the rotatable head means and respective ones of the decorative articles in the linear path of the elongate element passing through the head means; and the channel in the rotatable head means including at least one channel passing through the axis of rotation of the rotatable head means, thereby to accurately locate each decorative article relative to the linear path.

2. Apparatus as claimed in claim 1 wherein the head means includes three of said channels and said channels are provided symmetrically disposed with respect to one another.

3. Apparatus as claimed in claim 1 wherein said head means comprises a disc having a depth greater than said channels.

4. Apparatus as claimed in claim 3 wherein said disc has a portion removed about said axis to expose said channels in that portion.

5. Apparatus as claimed in claim 1 wherein the head means is connected to gear means adapted to index said rotation to sequentially align the article carrying apertures in said carrier tape in the path of said element through the head means.

6. Apparatus as claimed in claim 1, further comprising the carrier tape and the tape having the decorative articles arranged thereon sequentially with the apertures extending therethrough and so placed that the teeth will engage in two tape apertures on opposite sides of an article on the tape.

7. Apparatus for transferring and placing decorative articles which are located at spaced intervals along a carrier tape, wherein the carrier tape also has apertures provided along the carrier tape, the apparatus comprising an elongate element and means for actuating the elongate element to move along a linear path;

rotatable head means having at least one aperture formed to allow the elongate element, at predetermined rotational positions of the rotatable head means, to pass through the rotatable head means aperture along the linear path;

the rotatable head means also being formed to guide the tape by the rotation of the rotatable head means to sequentially align respective rotatable head means apertures in the path of the elongate element passing through the rotatable head means;

a support bracket; a housing which is floating with respect to a support bracket; the rotatable head means being carried by the housing.

8. Apparatus for transferring and placing decorative articles which are located at spaced intervals along a carrier tape, wherein the carrier tape also has apertures provided along the carrier tape, the apparatus comprising an elongate element and means for actuating the elongate element to move along a linear path;

the rotatable head means having at least one aperture formed to allow the elongate element, at predetermined rotational positions of the rotatable head means to pass through the rotatable head means along the linear path;

the rotatable head means also being formed to guide the tape by the rotation of the rotatable head means to sequentially align respective rotatable head means apertures in the path of the elongate element passing through the rotatable head means;

a housing, the rotatable head means being carried by the housing, the housing being biased against movement of the elongate element wherein the housing and the rotatable head means carried thereby are lowered to an operative position before further downward movement of the elongate member in the rotatable head means aperture expresses from the tape an article that is then in the path of the elongate member.

9. Apparatus as claimed in claim 8 wherein operation of the elongate element initially causes downward movement of the housing carrying said head means prior to said elongate element passing through said head means to express a decorative article from a carrier tape passing over said head means.

* * * * *